(12) United States Patent
Hagiwara et al.

(10) Patent No.: US 9,318,275 B2
(45) Date of Patent: Apr. 19, 2016

(54) ELECTROCHEMICAL DEVICE

(71) Applicant: TAIYO YUDEN CO., LTD., Taito-ku, Tokyo (JP)

(72) Inventors: Naoto Hagiwara, Takasaki (JP); Kyotaro Mano, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 14/422,288

(22) PCT Filed: Sep. 21, 2012

(86) PCT No.: PCT/JP2012/074148
§ 371 (c)(1),
(2) Date: Feb. 18, 2015

(87) PCT Pub. No.: WO2014/041702
PCT Pub. Date: Mar. 20, 2014

(65) Prior Publication Data
US 2015/0221450 A1      Aug. 6, 2015

(30) Foreign Application Priority Data

Sep. 13, 2012 (JP) ................................ 2012-201150

(51) Int. Cl.
*H01M 2/18*     (2006.01)
*H01G 11/52*    (2013.01)
(Continued)

(52) U.S. Cl.
CPC ............... *H01G 11/52* (2013.01); *H01G 11/26* (2013.01); *H01G 11/78* (2013.01); *H01M 2/18* (2013.01);
(Continued)

(58) Field of Classification Search
CPC ....... H01M 2/14; H01M 2/18; H01M 10/525; H01M 10/0585; H01M 10/0436; H01M 10/0463; H01M 2220/30; H01G 11/52; H01G 11/26; H01G 11/78
See application file for complete search history.

(56) References Cited

U.S. PATENT DOCUMENTS 5,521,027 A *   5/1996   Okuno .................. H01M 4/525
                                                    429/199
2004/0157121 A1   8/2004   Watanabe et al.
(Continued)

FOREIGN PATENT DOCUMENTS

JP   2001-244148 A   9/2001
JP   2001-244156 A   9/2001
(Continued)

OTHER PUBLICATIONS

Notification of Transmittal of Translation of the International Preliminary Report on Patentability (PCT/IB/338) mailed Mar. 26, 2015, with International Preliminary Report on Patentability (PCT/IB/373) and Written Opinion of the International Searching Authority (PCT/ISA/237), for corresponding international application PCT/JP2012/074148.

(Continued)

*Primary Examiner* — Ula C Ruddock
*Assistant Examiner* — Lisa S Park
(74) *Attorney, Agent, or Firm* — Law Office of Katsuhiro Arai (57) ABSTRACT

An electrochemical device is provided with an electric storage element that is constituted by a first electrode sheet, a second electrode sheet, and a separator sheet installed between the two electrode sheets. The separator sheet includes: a first part (high liquid absorptivity part) sandwiched between the two electrode sheets; a second part (low liquid absorptivity part) extending outward from the two electrode sheets; and a third part (contact part) in contact with a rim surface of the second electrode sheet, whereby the electrochemical device can quickly and reliably resolve a phenomenon of the amount of electrolyte decreasing in the part of the separator sheet sandwiched between the two electrode sheets, even if the phenomenon occurs frequently.

4 Claims, 8 Drawing Sheets

(51) Int. Cl.
*H01G 11/78* (2013.01)
*H01G 11/26* (2013.01)
*H01M 10/04* (2006.01)
*H01M 10/0525* (2010.01)
*H01M 10/0585* (2010.01)

(52) U.S. Cl.
CPC ...... *H01M 10/0436* (2013.01); *H01M 10/0463* (2013.01); *H01M 10/0525* (2013.01); *H01M 10/0585* (2013.01); *H01M 2220/30* (2013.01); *Y02E 60/13* (2013.01)

(56) References Cited

U.S. PATENT DOCUMENTS

| 2005/0214647 | A1 | 9/2005 | Tanaka et al. | |
|---|---|---|---|---|
| 2006/0006063 | A1* | 1/2006 | Tanaka et al. | 204/280 |
| 2012/0237820 | A1 | 9/2012 | Hagiwara et al. | |
| 2013/0330596 | A1 | 12/2013 | Mano et al. | |
| 2014/0057158 | A1 | 2/2014 | Hagiwara et al. | |

FOREIGN PATENT DOCUMENTS

| JP | 2004-227959 A | 8/2004 |
|---|---|---|
| JP | 2005-277064 A | 10/2005 |
| JP | 2008-085017 A | 4/2008 |
| JP | 2009-278068 A | 11/2009 |
| JP | 2012-069508 A | 4/2012 |
| JP | 5076034 B1 | 11/2012 |
| WO | 2013/183326 A1 | 12/2013 |

OTHER PUBLICATIONS

International Search Report (ISR) mailed Dec. 18, 2012, issued for International application No. PCT/JP2012/074148.

Decision of Refusal issued by Japanese Patent Office, mailed Nov. 16, 2012, for counterpart Japanese application No. 2012-202305.

* cited by examiner

ELECTROCHEMICAL DEVICE

TECHNICAL FIELD

The present invention relates to an electrochemical device in which a chargeable/dischargeable electric storage element is sealed.

BACKGROUND ART

Mobile phones, notebook PCs, video cameras, digital cameras, and other electronic equipment use a surface-mountable electrochemical device, such as an electric double-layer capacitor or lithium ion battery, as their power source suitable for backing up the memory and the like.

This electrochemical device generally has: an insulating case with a concaved section constituting an opening in the top surface; a conductive lid that closes the concaved section of the case in a water-tight and air-tight manner; a chargeable/dischargeable electric storage element and electrolyte enclosed in the closed concaved section; a positive electrode terminal and negative electrode terminal provided on the mounting surface of the case; a positive electrode wiring for electrically connecting the positive electrode terminal and the positive electrode side of the electric storage element; and a negative electrode wiring for electrically connecting the negative electrode terminal and the negative electrode side of the electric storage element (refer to Patent Literature 1).

The electric storage element is constituted by a first electrode sheet of specified size made of active material, a second electrode sheet of specified size made of active material, and a separator sheet of specified size made of ion-permeating sheet, which are stacked together in the order of the first electrode sheet, separator sheet, and second electrode sheet. The outer periphery part of the separator sheet whose external dimensions are slightly larger than the external dimensions of the two electrode sheets extends slightly outward from the two electrode sheets. The material of the first electrode sheet may be the same as or different from the material of the second electrode sheet depending on the type of the electrochemical device.

Additionally, for the separator sheet whose functions include preventing the first electrode sheet and second electrode sheet from shorting with each other, retaining the electrolyte between the facing surfaces of the first electrode sheet and second electrode sheet, and allowing the ions to move in the retained electrolyte, a fiber-based porous sheet is generally used whose thickness is suitable for achieving these functions. For example, Patent Literature 2 describes a separator for electric double-layer capacitor constituted by a porous sheet and having a high-density layer with a void ratio of approx. 20 to 50% and low-density layer with a void ratio of approx. 50 to 80%.

With the aforementioned electrochemical device, the electrolyte is mostly impregnated into the first electrode sheet, second electrode sheet, and separator sheet and does not flow much in the charge/discharge process, but if the electrolyte in the two electrode sheets breaks down, deteriorates, or undergoes other change during this process, then the electrolyte impregnated into the part of the separator sheet sandwiched between the two electrode sheets may be drawn into the two electrode sheets, thus causing a phenomenon of the electrolyte in this part decreasing, albeit by a very small amount.

If this phenomenon occurs, the part of the separator sheet sandwiched between the two electrode sheets tries to draw in the amount of electrolyte corresponding to what has been drawn into the two electrode sheets, from the part of the separator sheet extending outward from the two electrode sheets. However, since the part of the separator sheet extending outward from the two electrode sheets has the same thickness and liquid absorptivity as the part sandwiched between the electrode sheets, it is difficult to instantly draw the electrolyte into the part sandwiched between the two electrode sheets from the part extending outward from the two electrode sheets. Also because the amount of electrolyte impregnated into the part extending outward from the two electrode sheets is very small, frequent occurrences of the aforementioned phenomenon will not prevent any decrease in the amount of electrolyte in the part of the separator sheet sandwiched between the two electrode sheets and, as a result of accumulation of this phenomenon, the charge/discharge characteristics will drop.

Note that the aforementioned term "liquid absorptivity" corresponds to the water absorption rate as measured by the Byreck method specified in JIS-L-1907. Also in the "Modes for Carrying Out the Invention" section of the Specification, mm/10 min is used as the unit of liquid absorptivity.

PRIOR ART LITERATURES

Patent Literatures

Patent Literature 1: Japanese Patent Laid-open No. 2009-278068
Patent Literature 2: Japanese Patent Laid-open No. 2008-85017

SUMMARY OF THE INVENTION

Problems to be Solved by the Invention

The object of the present invention is to provide an electrochemical device that can quickly and reliably resolve a phenomenon of the amount of electrolyte decreasing in the part of the separator sheet sandwiched between the two electrode sheets, even if the phenomenon occurs frequently.

Means for Solving the Problems

To achieve the aforementioned object, the electrochemical device pertaining to an embodiment of the present invention has a case, lid, and electric storage element.

The case has a concaved section constituting an opening.

The lid is coupled to the opening side of the case to form a closed section between itself and the concaved section.

The electric storage element includes a first electrode sheet, second electrode sheet and porous separator sheet. The first electrode sheet has a first principal surface and first rim surface formed around the first principal surface. The second electrode sheet has a second principal surface facing the first principal surface and second rim surface formed around the second principal surface. The separator sheet is installed between the first principal surface and second principal surface. The electric storage element is sealed inside the closed section and constituted in a chargeable/dischargeable manner.

In the aforementioned electrochemical device, the separator sheet has a first part, second part and third part.

The first part is placed between the first electrode sheet and second electrode sheet. The second part extends outward from the first electrode sheet and second electrode sheet. The third part is provided at least in one part of the second part and in contact with at least one of the first rim surface and second rim surface.

If the electrolyte in the two electrode sheets breaks down, deteriorates or undergoes other change during the charge/discharge process, then the electrolyte impregnated into the first part of the separator sheet sandwiched between the two electrode sheets may be drawn into the two electrode sheets, thus causing a phenomenon of the electrolyte in this part decreasing, albeit by a very small amount; according to the present invention, however, the electrolyte impregnated into the second part is instantly drawn into the first part according to the liquid absorptivity difference so that the first part is immediately replenished with electrolyte even if the aforementioned phenomenon occurs. Also because a considerable amount of electrolyte is impregnated into the second part, the first part is immediately replenished with electrolyte every time the aforementioned phenomenon occurs, even if it occurs frequently. In other words, the phenomenon of the amount of electrolyte decreasing in the part of the separator sheet sandwiched between the two electrode sheets can be resolved quickly and reliably, even if the phenomenon occurs frequently, thus preventing the charge/discharge characteristics from dropping as a result of accumulation of this phenomenon.

In addition, since the third part provided in at least one part of the second part is in contact with the rim surface of one of the electrode sheets, the phenomenon of the amount of electrolyte decreasing in the first part, which occurs as the electrolyte impregnated into the first part is drawn into the two electrode sheets, can be suppressed by the electrolyte-replenishing action from the third part to the applicable electrode sheet.

MODES FOR CARRYING OUT THE INVENTION

Embodiments of the present invention are explained below by referring to the drawings.

First Embodiment

FIGS. 1 to 5 show the electrochemical device pertaining to the first embodiment of the present invention. An electrochemical device 100 shown in FIGS. 1 and 2 have a case 11, lid 12, electric storage element 13, positive electrode terminal 14, negative electrode terminal 15, positive electrode wiring 16 and negative electrode wiring 17.

<Constitution of Case>

Figure 1:
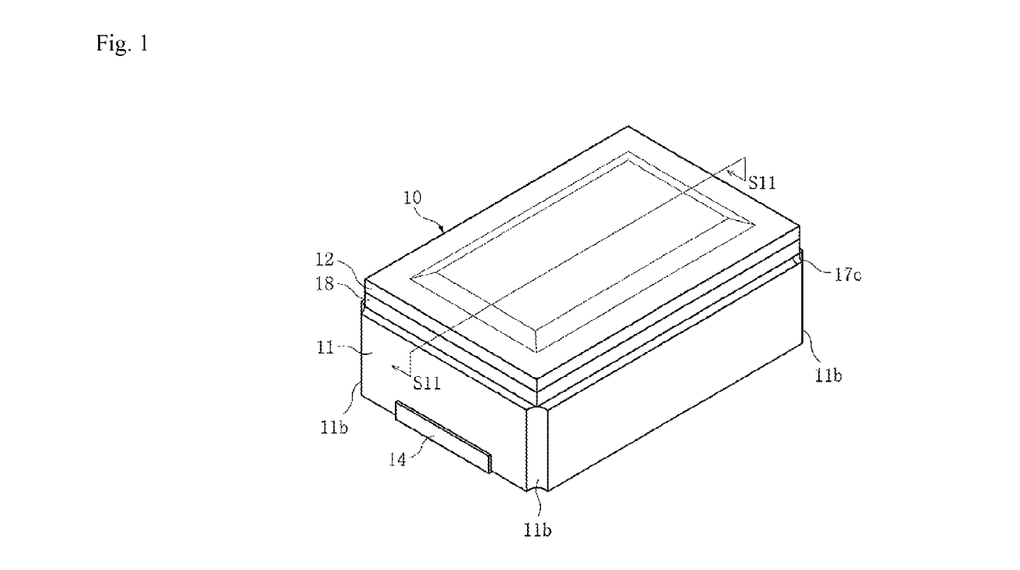
FIG. 1 External perspective view of the electrochemical device pertaining to the first embodiment of the present invention.
Figure 2:
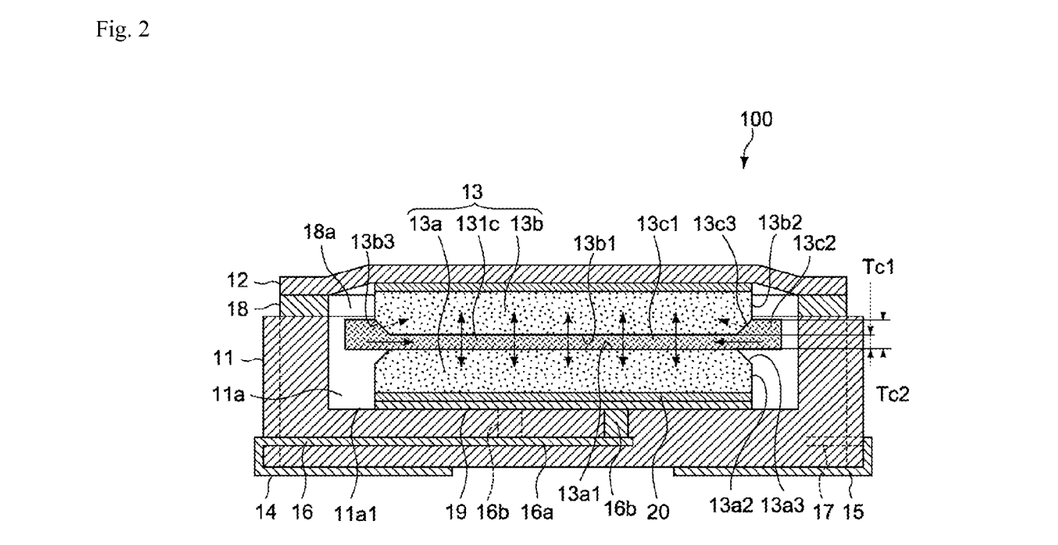
FIG. 2 Enlarged section view of the electrochemical device shown in FIG. 1 cut along line S11-S11.

The case 11 is made of alumina or other insulator material and formed in a manner constituting a rectangular solid shape of specified length, width and height. In addition, a concaved section 11a of specified depth and rectangular silhouette in top view is formed in the top surface of the case 11 to constitute an opening. In other words, the case 11 has an opening constituted by the concaved section 11a in its top surface and its bottom surface is used as the mounting surface. Additionally, when the case 11 is viewed from above, a cutout 11b whose silhouette in top view is roughly one-quarter of a circle is formed in the vertical direction in each of the four corners. Provided in this case 11 are the positive electrode terminal 14, negative electrode terminal 15, positive electrode wiring 16, negative electrode wiring 17, as well as a coupling ring 18 and current collector film 19.

The positive electrode terminal 14 is made of gold or other conductor material and is formed in a manner constituting an L-shaped section extending from the center of one end face in the lengthwise direction to the bottom surface of the case 11 and also having a specified width. The negative electrode terminal 15 is made of gold or other conductor material and is formed in a manner constituting an L-shaped section extending from the center of the other end face in the lengthwise direction to the bottom surface of the case 11 and also having roughly the same width as the positive electrode terminal 14.

Although not illustrated, if due to the material of the case 11 or for other reasons sufficient adhesion strength cannot be achieved by forming the positive electrode terminal 14 and negative electrode terminal 15 directly on the side and bottom surfaces of the case 11, then ideally an adhesion support layer (such as one constituted by a tungsten membrane and nickel membrane arranged in this order from the case side) should be formed beforehand on the side and bottom surfaces of the case 11 to increase the adhesion strength of the positive electrode terminal 14 and negative electrode terminal 15 with respect to the side and bottom surfaces.

Figure 3:
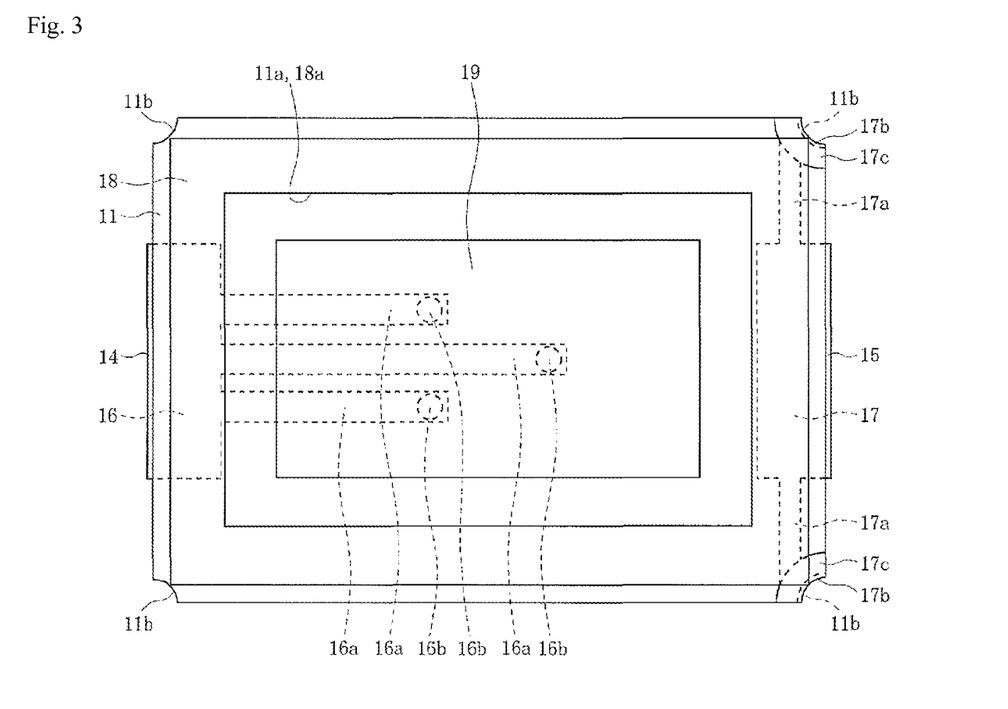
FIG. 3 Enlarged top view of the case shown in FIG. 1.

The positive electrode wiring 16 is made of tungsten or other conductor material and is formed inside the case 11 in a manner extending from the center of the one end face of the case 11 in the lengthwise direction to the bottom surface of the current collector film 19. To be specific, as shown in FIG. 3, the positive electrode wiring 16 has a part (not denoted by any symbol) having roughly the same width as the positive electrode terminal 14, a total of three belt-shaped parts 16a extending inward from this part, and a total of three column-shaped parts 16b extending from the end of each belt-shaped part 16a to the current collector film 19. The position of each column-shaped part 16b is different at a base of the concaved section 11a of the case 11, and the top surface of each column-shaped part 16b is exposed at the base of the concaved section 11a. On the other hand, the part of the positive electrode wiring 16 exposed from the one end face of the case 11 in the lengthwise direction is electrically connected to the side surface part of the positive electrode terminal 14.

The negative electrode wiring 17 is made of tungsten or other conductor material and is partially formed inside the case 11 in a manner extending from the center of the other end face in the lengthwise direction to the top surface of the case 11, with the remainder formed on the side and top surfaces of the case 11. To be specific, as shown in FIG. 3, the negative electrode wiring 17 has a part (not denoted by any symbol) having roughly the same width as the negative electrode terminal 15, a total of two belt-shaped parts 17a extending outward from this part and positioned inside the case 11, a total of two belt-shaped parts 17b continuing from the belt-shaped parts 17a and positioned on the interior surfaces of two cutouts 11b in the case 11, and a total of two fan-shaped parts 17c continuing from the belt-shaped parts 17b and positioned on the top surface of the case 11. In addition, the part of the negative electrode wiring 17 exposed from the other end face of the case 11 in the lengthwise direction is electrically connected to the side surface part of the negative electrode terminal 15, while each fan-shaped part 17c of the negative electrode wiring 17 on the top surface of the case 11 is electrically connected to the bottom surface of the coupling ring 18.

The coupling ring 18 (coupling member) is made of Kovar (iron-nickel-cobalt alloy) or other conductor material and is formed in a rectangular shape whose silhouette in top view is slightly smaller than the silhouette in top view of the case 11. In addition, the silhouette in top view of an inner hole 18a of the coupling ring 18 is roughly identical to the silhouette in top view of the concaved section 11a of the case 11. Since this coupling ring 18 is connected via a coupling member to the top surface of the case 11 in such a way that its inner hole 18a aligns with the concaved section 11a, the inner hole 18a, by working in cooperation with the concaved section 11a, virtually constitutes the concaved section.

Although not illustrated, if due to the material of the case 11 or for other reasons sufficient coupling strength cannot be achieved by coupling the coupling ring 18 directly onto the top surface of the case 11 using a joining member such as gold-copper alloy or other brazing material, then ideally a coupling support layer (such as one constituted by a tungsten membrane and nickel membrane arranged in this order from the top surface side) should be formed beforehand on the top surface of the case 11 to increase the coupling strength of the coupling ring 18 with respect to the top surface. Additionally, if the coupling ring 18 is made of any material having low corrosion resistance with respect to the electrolyte, then ideally a corrosion-resistance membrane (such as one constituted by a nickel membrane and gold membrane arranged in this order from the surface side or by a nickel membrane and platinum, silver, palladium, or other metal membrane instead of gold membrane) to increase the corrosion resistance with respect to the electrolyte should be formed beforehand on the surface (at least on the top and bottom surfaces and the interior surface of the inner hole 18a) of the coupling ring 18.

The current collector film 19 is made of aluminum or other conductor material and is formed at the base of the concaved section 11a of the case 11 in a manner creating a silhouette in top view which is slightly smaller than the silhouette in top view of the base. In addition, the current collector film 19 formed at the base of the concaved section 11a of the case 11 is electrically connected to the exposed part of each column-shaped part 16b of the positive electrode wiring 16.

Although not illustrated, if due to the material of each column-shaped part 16b of the positive electrode wiring 16 or for other reasons sufficient electrical conduction is not achieved between the current collector film 19 and the exposed part of each column-shaped part 16b by forming the current collector film at the base of the concaved section 11a of the case 11, then ideally a conduction support layer (such as one constituted by a nickel membrane and gold membrane arranged in this order from the surface side of the projecting part) should be formed beforehand on the surface of the exposed part.

<Constitution of Lid and Coupling Method>

The lid 12 is coupled to the opening side of the case 11 to form a closed section (cell) between itself and the concaved section 11a. The lid 12 is made of Kovar (iron-nickel-cobalt alloy) or other conductor material, or preferably a clad material constituted by a Kovar base material with nickel membranes provided on its top and bottom surfaces, clad material constituted by a Kovar base material with nickel membranes provided on its bottom surface, or clad material using platinum, silver, gold, palladium, or other metal membranes instead of the nickel membranes, and is formed in a rectangular shape whose silhouette in top view is roughly identical to the silhouette in top view of the coupling ring 18. Although the drawings show the lid 12 as one whose center part is raised in a rectangular shape, the lid 12 can also be such that it forms a planar shape.

After the electric storage element 13 is placed in the concaved section 11a of the case 11 (including the inner hole 18a of the coupling ring 18), the outer periphery part of the bottom surface of the lid 12 is coupled to the top surface of the coupling ring 18 in an electrically conductive manner, and as a result of this coupling each concaved section 11a of the case 11 (including the inner hole 18a of the coupling ring 18) is closed in a water-tight and air-tight manner. Coupling of the lid 12 onto the coupling ring 18 can be achieved by seam welding, laser welding or other direct joining method, or by any indirect joining method via a conductive joining member.

<Constitution of Electric Storage Element and Placement Method>

The electric storage element 13 is constituted by a first electrode sheet 13a of rectangular shape, second electrode sheet 13b of rectangular shape, and separator sheet 131c of rectangular shape installed between the two electrode sheets 13a, 13b. The first electrode sheet 13a and second electrode sheet 13b have a silhouette in top view which is smaller than the silhouette in top view of the concaved section 11a of the case 11, while the separator sheet 131c has a silhouette in top view which is slightly larger than the silhouette in top view of the two electrode sheet 13a, 13b and slightly smaller than the silhouette in top view of the concaved section 11a of the case 11.

The first electrode sheet 13a and second electrode sheet 13b are made of active carbon, PAS (polyacene semiconductor), or other active material, while the separator sheet 131c is made of a fiber-based porous sheet whose primary material is glass fiber, cellulose fiber, plastic fiber, etc. The material of the first electrode sheet 13a may be the same as or different from the material of the second electrode sheet 13b depending on the type of the electrochemical device 100.

The first electrode sheet 13a has a principal surface 13a1 contacting the separator sheet 131c (first principal surface), outer side surface 13a2, and rim surface 13a3 formed around the principal surface 13a1 (first rim surface). In this embodiment, the rim surface 13a3 is formed between the principal surface 13a1 and outer side surface 13a2 in a manner adjoining the principal surface 13a1. The rim surface 13a3 is constituted by a planar or curved tapered surface formed in a manner cutting out the periphery of the principal surface 13a1.

Similarly, the second electrode sheet 13b has a principal surface 13b1 contacting the separator sheet 131c (second principal surface), outer side surface 13b2, and rim surface 13b3 formed around the principal surface 13b1 (second rim surface). In this embodiment, the rim surface 13b3 is formed between the principal surface 13b1 and outer side surface 13b2 in a manner adjoining the principal surface 13b1. The rim surface 13b3 is constituted by a planar or curved tapered surface formed in a manner cutting out the periphery of the principal surface 13b1.

The separator sheet 131c has a first part 13c1 placed on (sandwiched between) the two electrode sheets 13a, 13b and second part 13c2 extending outward from the two electrode sheets 13a, 13b. The first part 13c1 and second part 13c2 are formed in a manner continuing to each other. The second part 13c2 is constituted to have lower liquid absorptivity than the first part 13c1, and in the following explanations, the first part may also be referred to as the "high liquid absorptivity part," while the second part may also be referred to as the "low liquid absorptivity part."

The separator sheet 131c further has a third part 13c3. The third part 13c3 is provided at least in one part of the second part 13c2, and in this embodiment, it is provided in the surface region of the second part 13c2 close to the second electrode sheet 13b. The third part 13c3 is in contact with at least one part of the rim surface 13b3 of the second electrode sheet 13b. In the following explanations, the third part may also be referred to as the "contact part."

The thickness (maximum thickness) $Tc2$ of the low liquid absorptivity part 13c2 is greater than the thickness $Tc1$ of the high liquid absorptivity part 13c1, where the thickness ratio $Tc1/Tc2$ is in a range of 0.3 to 0.8, for example. As explained later, the high liquid absorptivity part 13c1 is constituted by the crushed center part of the base material of separator sheet RM13c shown in FIG. 4, while the low liquid absorptivity part 13c2 is constituted by the uncrushed outer periphery part of the base material of separator sheet RM13c.

This electric storage element 13 is sealed with the electrolyte (not illustrated) inside the concaved section 11a closed by the lid 12 (including the inner hole 18a of the coupling ring 18). For the electrolyte, any known electrolyte, or specifically solution prepared by dissolving electrolyte salt in solvent or solvent-free ionic liquid, can be used as deemed appropriate. Specific examples of the former type of electrolyte (solution) include electrolytes whose solvent is chained sulfone, cyclic sulfone, chained carbonate, cyclic carbonate, chained ester, cyclic ester, nitrile, etc., containing lithium ions, quaternary ammonium ions, imidazolium ions, and other cations as well as BF4, PF6, TFSA, and other anions. Specific examples of the latter type of electrolyte (ionic liquid) include electrolytes containing imidazolium ions, pyridinium ions, quaternary ammonium ions, and other cations as well as BF4, PF6, TFSA, and other anions.

Also, as shown in FIG. 2, the bottom surface of the first electrode sheet 13a of the electric storage element 13 is electrically connected to the top surface of the current collector film 19 via a conductive adhesive layer 20, while the top surface of the second electrode sheet 13b is electrically connected to the bottom face of the lid 12 via a conductive adhesive layer 21. These conductive adhesive layers 20, 21 are cured conductive adhesive, and for this conductive adhesive, preferably thermosetting adhesive containing conductive grains, such as epoxy adhesive containing graphite grains, is used.

Figure 4:
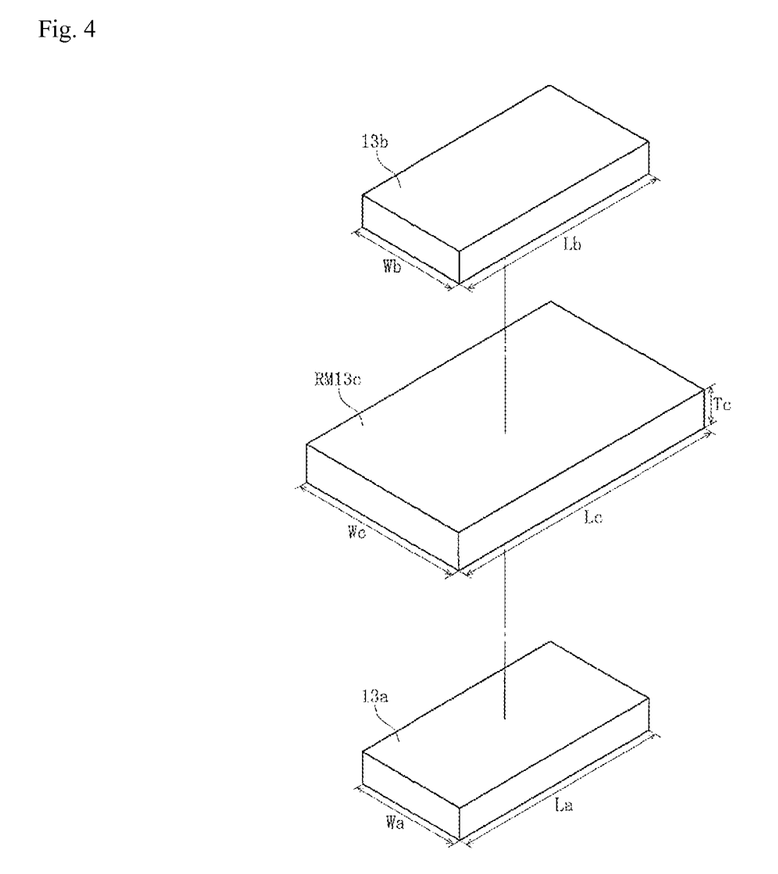
FIG. 4 Perspective view showing the constitution, prior to placement, of the electric storage element shown in FIG. 2.

Here, the how the electric storage element 13 is placed is explained together with its constitution prior to placement. FIG. 4 schematically shows the constitution of the electric storage element 13 prior to placement. In the figure, 13a represents the first electrode sheet, 13b represents the second electrode sheet, and RM13c represents the base material of the separator sheet. In FIG. 4, the rim surfaces 13a3, 13b3 of the two electrode sheets 13a, 13b are not illustrated.

The first electrode sheet 13a has a specified length La and width Wa, while the second electrode sheet 13b has roughly the same length Lb and width Wb as the first electrode sheet 13a. The material of the first electrode sheet 13a and that of the second electrode sheet 13b were explained earlier. The thickness of the sheets may be the same or different depending on the type of the electrochemical device 100.

The base material of separator sheet RM13c has a specified length Lc, width Wc, thickness Tc, specified void ratio and liquid absorptivity (average), and hardness (flexibility) that allows it to be crushed by the two electrode sheets 13a, 13b. The length Lc of the base material of separator sheet RM13c is preferably greater by approx. 20 to 40% than the lengths La, Lb of the two electrode sheets 13a, 13b, while its width Wc is preferably greater by approx. 20 to 40% than the widths Wa, Wb of the two electrode sheets 13a, 13b. Also, the material of the base material of separator sheet RM13c is the same as the material of the separator sheet 131c as explained earlier.

Figure 5:
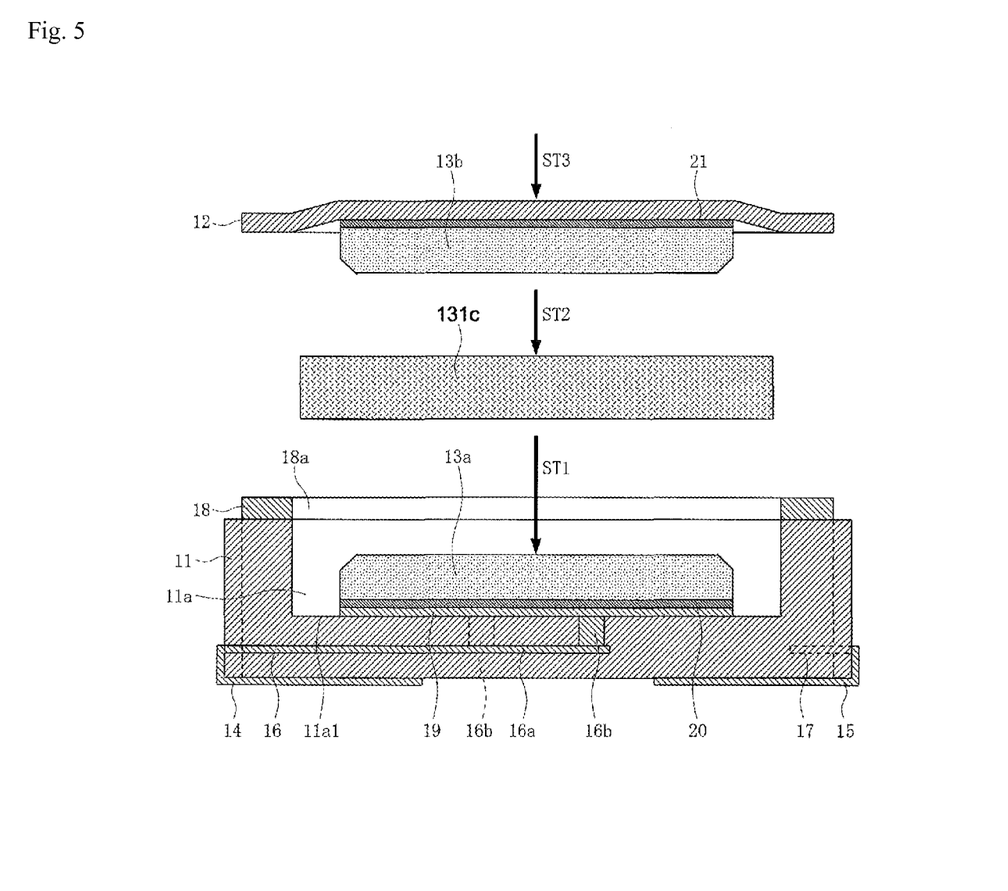
FIG. 5 Drawing for explaining how the base materials for first electrode sheet, second electrode sheet and separator as shown in FIG. 4 are placed (how the electric storage element is placed).

To place the electric storage element 13, as shown in FIG. 5, first uncured conductive adhesive is applied to the surface of the current collector film 19 and the bottom surface of the first electrode sheet 13a is pressed against the conductive adhesive so that it adheres, after which the conductive adhesive is cured and then electrolyte is injected and thus impregnated into the first electrode sheet 13a (refer to Step ST1). Next, the base material of separator sheet RM13c is placed on the top surface 13a1 of the first electrode sheet 13a and then electrolyte is injected and thus impregnated into the base material of separator sheet RM13c (refer to Step ST2). Around the same time, the same uncured conductive adhesive is applied to the bottom surface of the lid 12 and the top surface of the second electrode sheet 13b is pressed against the conductive adhesive so that it adheres, after which the conductive adhesive is cured and then electrolyte is injected and thus impregnated into the second electrode sheet 13b. Next, the outer periphery part of the bottom surface of the lid 12 is overlaid onto the top surface of the coupling ring 18, while at the same time the bottom surface 13b1 of the second electrode sheet 13b is pressed against the top surface of the separator sheet 131c (refer to Step ST3). Next, the lid 12 is coupled to the coupling ring 18.

If the applicable polarities of the first electrode sheet 13a and second electrode sheet 13b constituting the electric storage element 13 are predetermined, then attention should be paid to the order of insertion with respect to each concaved section 11a of the case 11 (including the inner hole 18a of the coupling ring 18) when the electric storage element 13 is placed in it. For example, if the applicable polarity of the first electrode sheet 13a is set to positive and that of the second electrode sheet 13b is set to negative, then the first electrode sheet 13a on the positive electrode side should face the top surface of the current collector film 19, while the second electrode sheet 13b on the negative electrode side should face the bottom surface of the lid 12.

In Step ST3 mentioned above, the center part of the base material of separator sheet RM13c is crushed by the top surface of the first electrode sheet 13a and bottom surface of the second electrode sheet 13b, and this crushed part becomes the high liquid absorptivity part (first part) 13c1 of thickness Tc1 (refer to FIG. 2). The outer periphery part of the base material of separator sheet RM13c is not crushed, and therefore this uncrushed part becomes the low liquid absorptivity part (second part) 13c2 of thickness (maximum thickness) Tc2 (refer to FIG. 2), and this thickness (maximum thickness) Tc2 is the same as the thickness Tc of the base material of separator sheet RM13c.

In this embodiment, an example where the contact part 13c3 of the separator sheet 131c contacts the rim surface 13b3 of the second electrode sheet 13b was explained; instead of this, however, the contact part 13c3 may be in contact with the rim surface 13a3 of the first electrode sheet 13a, or the contact part 13c3 may be formed on both sides of the low liquid absorptivity part 13c2 so as to contact the rim surfaces 13a3, 13b3 of the two electrode sheets 13a, 13b, respectively. The form of the contact part 13c3 can be set as deemed appropriate according to the initial shape of the separator sheet 131c, shapes and sizes of the two electrode sheets 13a, 13b, and the amount by which the separator sheet 131c is crushed by the two electrode sheets 13a, 13b, among others.

For example, any method can be adopted as deemed appropriate in order to stably form the contact part 13c3 of the separator sheet 131c as shown in FIG. 2, such as not forming the rim surface 13a3 of the first electrode sheet 13a, or making the size (Wb and Lb) of the second electrode sheet 13b smaller than the size (Wa and La) of the first electrode sheet 13a, or forming the taper angle of the rim surface 13b3 of the second electrode sheet 13b to be more gradual than the taper angle of the rim surface 13a3 of the first electrode sheet 13a.

<Void Ratio and Liquid Absorptivity of Separator Sheet>

Here, the void ratios and liquid absorptivities of the high liquid absorptivity part 13c1 and low liquid absorptivity part 13c2 of the separator sheet 131c are explained using specific examples.

According to an experiment, when a base material of separator sheet RM13c having a void ratio of 85% and liquid absorptivity (average) of 10 mm/10 min with respect to electrolyte (solution whose solvent was cyclic sulforane, cation was TEMA and anion was BF4 was used here) was used to obtain a separator sheet 131c of 0.5 in thickness ratio Tc1/Tc2 where Tc1 represents the thickness of the high liquid absorptivity part 13c1 and Tc2 represents the thickness (maximum thickness) of the low liquid absorptivity part 13c2, then the void ratio of the high liquid absorptivity part 13c1 was approx. 70% and that of the low liquid absorptivity part 13c2 was approx. 84%, while the liquid absorptivity (average) of the high liquid absorptivity part 13c1 was 16 mm/10 min and that (average) of the low liquid absorptivity part 13c2 was 10.5 mm/10 min.

In this case, the void ratio (approx. 70%) of the high liquid absorptivity part 13c1 formed by crushing as mentioned earlier did not drop significantly compared to the void ratio (85%) of the base material of separator sheet RM13c or that (approx. 84%) of the low liquid absorptivity part 13c2, because the void ratio of the base material of separator sheet RM13c used was high. According to other experiment, a void ratio of 70 to 90% could be ensured for the high liquid absorptivity part 13c1 when a base material of separator sheet RM13c with a void ratio of 85 to 95% was used, so long as the thickness ratio Tc1/Tc2 was 0.5. In addition, the void ratio of the high liquid absorptivity part 13c1 did not drop significantly compared to the void ratio of the base material of separator sheet RM13c or that of the low liquid absorptivity part 13c2 when a base material of separator sheet RM13c with a void ratio of 85 to 95% was used, so long as the thickness ratio Tc1/Tc2 was in a range of 0.3 to 0.8.

On the other hand, the liquid absorptivity (average: 16 mm/10 min) of the high liquid absorptivity part 13c1 formed by crushing as mentioned earlier improved significantly compared to the liquid absorptivity (average: 10 mm/10 min) of the base material of separator sheet RM13c or that (average: 10.5 mm/10 min) of the low liquid absorptivity part 13c2, because the section sizes of the voids in the base material of separator sheet RM13c became smaller as a result of crushing as mentioned earlier. According to another experiment, a liquid absorptivity of 7 to 52 mm/min could be ensured for the high liquid absorptivity part 13c1 when a base material of separator sheet RM13c with a void ratio of 85 to 95% and liquid absorptivity (average) of 5 to 30 mm/10 min with respect to electrolyte was used, so long as the thickness ratio Tc1/Tc2 was 0.5. In addition, the liquid absorptivity of the high liquid absorptivity part 13c1 improved significantly compared to the liquid absorptivity of the base material of separator sheet RM13c or that of the low liquid absorptivity part 13c2 when a base material of separator sheet RM13c with a void ratio of 85 to 95% was used, so long as the thickness ratio Tc1/Tc2 was in a range of 0.3 to 0.8.

Effects Achieved by Electrochemical Device

First Embodiment

In the electrochemical device 100 according to this embodiment, the electrolyte is mostly impregnated into the first electrode sheet 13a, second electrode sheet 13b and separator sheet 131c. The separator sheet 131c has a low liquid absorptivity part 13c2 that extends outward from the two electrode sheets 13a, 13b and is thicker than the high liquid absorptivity part 13c1, meaning that a considerable amount of electrolyte is impregnated into the low liquid absorptivity part 13c2.

The electrolyte impregnated into the first electrode sheet 13a, second electrode sheet 13b and separator sheet 131c does not flow much during the charge/discharge process, but if the electrolyte in the two electrode sheets 13a, 13b breaks down, deteriorates, or undergoes other change during this process, then the electrolyte impregnated into the part of the separator sheet 131c sandwiched between the two electrode sheets 13a, 13b (high liquid absorptivity part 13c1) may be drawn into the two electrode sheets 13a, 13b, thus causing a phenomenon of the electrolyte in this part decreasing, albeit by a very small amount (refer to the solid-line arrows pointing up and down in FIG. 2).

According to the electrochemical device 100, the electrolyte impregnated into the low liquid absorptivity part 13c2 is instantly drawn into the first high liquid absorptivity part 13c1 according to the liquid absorptivity difference so that the high liquid absorptivity part 13c1 is immediately replenished with electrolyte even if the aforementioned phenomenon occurs (refer to the solid-line arrows pointing to the left and right in FIG. 2). Also, because a considerable amount of electrolyte is impregnated into the low liquid absorptivity part 13c2, the high liquid absorptivity part 13c1 is immediately replenished with electrolyte every time the aforementioned phenomenon occurs, even if it occurs frequently. In other words, the phenomenon of the amount of electrolyte decreasing in the part of the separator sheet 131c sandwiched between the two electrode sheets 13a, 13b (high liquid absorptivity part 13c1) can be resolved quickly and reliably, even if the phenomenon occurs frequently, thus preventing the charge/discharge characteristics from dropping as a result of accumulation of this phenomenon.

Also because the contact part (third part) 13c3 provided in one part of the surface of the low liquid absorptivity part 13c2 is in contact with the rim surface 13b3 of the second electrode sheet 13b, electrolyte is drawn in directly not only from the high liquid absorptivity part 13c1 to the second electrode sheet 13b, but also from the low liquid absorptivity part 13c2 to the second electrode sheet 13b via the contact part 13c3 (refer to the broken-line arrows in FIG. 2) as the electrolyte in the second electrode sheet 13b breaks down, deteriorates, or undergoes other change. In other words, the phenomenon of the amount of electrolyte decreasing in the high liquid absorptivity part 13c1, which occurs as the electrolyte impregnated into the high liquid absorptivity part 13c1 is drawn into the second electrode sheet 13b, can be suppressed by the electrolyte-replenishing action from the low liquid absorptivity part 13c2 and contact part 13c3 to the second electrode sheet 13b.

Also, according to this embodiment, any insufficiency in the amount of electrolyte impregnated into the high liquid absorptivity part 13c1 of the separator sheet 131c can be resolved and therefore the electrical continuity between the positive electrode and negative electrode can be maintained and rise in internal resistance prevented. In addition, characteristic changes associated with the use of an electrochemical device can be suppressed and stable production conditions in terms of yield and longevity can be determined.

Figure 6:
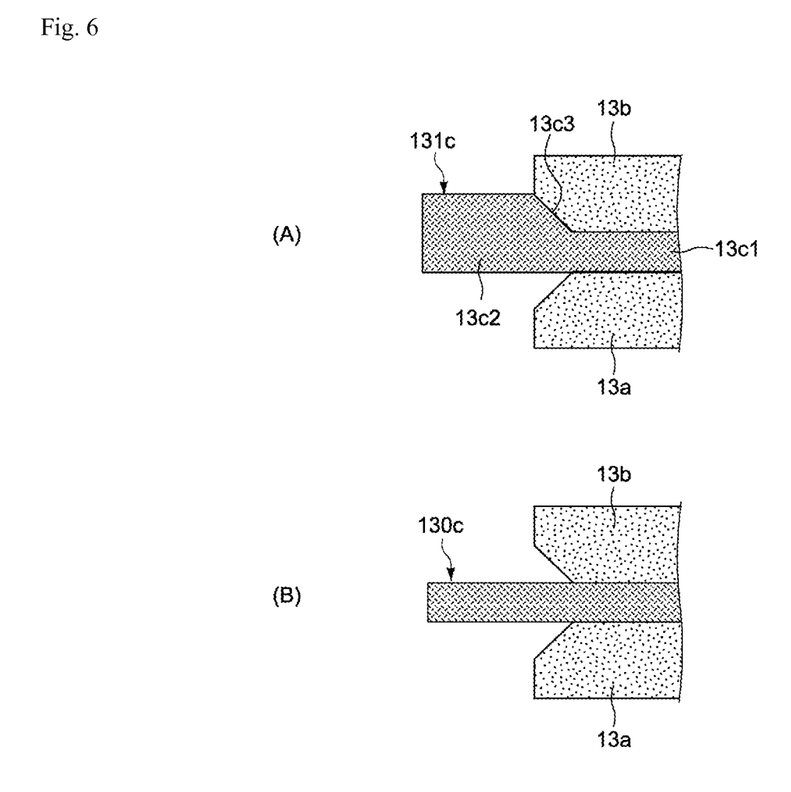
FIG. 6 (A) is a schematic section view of key parts of the electric storage element of the electrochemical device shown in FIG. 2, while (B) is a schematic section view of key parts of the electric storage element of the electrochemical device pertaining to a comparative example.

The inventors of the present invention compared the electrical characteristics of the electrochemical devices having the electric storage elements shown in FIGS. 6 (A) and (B). FIG. 6 (A) shows a key part of the electric storage element of the electrochemical device shown in FIG. 2. On the other hand, FIG. 6 (B) shows a key part of the electric storage element pertaining to a comparative example wherein such electric storage element has a separator sheet 130c whose part placed between the two electrode sheets 13a, 13b and part extending outward from the two electrode sheets 13a, 13b are constituted at roughly the same thickness. These two separator sheets 131c, 130c are each constituted by the same material and are different only in terms of the form in which they are stored in the concaved section 11a.

In the experiment, the initial internal resistance Ri [Ω] between the two electrode sheets 13a, 13b, internal resistance Ri [Ω] between the two electrode sheets 13a, 13b after charging, and yield [%], were compared, respectively, by changing the total amount of electrolyte injected into the cell. The results are shown in Table 1. In this example, the electric storage element was charged for 500 hours by continuously applying voltage and temperature (such as 3.3 V, 70° C.). The electrochemical devices in this embodiment and comparative example were produced to have the same capacitive density.

part of the separator positioned between the two electrode sheets 13a, 13b, which caused the internal resistance Ri to rise.

As is evident from above, in the comparative example the tolerance center must be set near 1.45 mg if the tolerance is, for example, ±0.05 mg in the electrolyte injection step, which would cause the longevity traits to vary. Accordingly, it is difficult, in the comparative example, to determine stable production conditions in terms of yield and longevity, which necessitates design changes aimed at lowering the capacitive density.

In this embodiment, on the other hand, the yield was not affected when the amount of electrolyte was in a range of 1.7 mg or less, and the internal resistance stabilized when the amount of electrolyte was 1.6 mg or more. This is because the separator 131c pertaining to this embodiment has the high liquid absorptivity part (first part) 13c1 and low liquid absorptivity part (second part) 13c2, and thus is able to retain a greater amount of electrolyte than the separator 130c pertaining to the comparative example.

Additionally, in this embodiment, while the internal resistance Ri after charging also exhibited a tendency to rise more when there was less electrolyte, the extent of rise could be kept lower than in the comparative example. This is because the separator 131c pertaining to this embodiment has a contact part (third part) 13c3 in one part of the low liquid absorptivity part 13c2, which is in contact with the rim surface 13b3 of the second electrode sheet 13b, and this makes it possible to supply electrolyte from the contact part 13c3 to the electrode sheet 13b and consequently keep any drop in the amount of solution in the high liquid absorptivity part 13c1 to less than that in the comparative example.

Furthermore in this embodiment, the internal resistance R was stable when the amount of electrolyte was 1.6 mg or more. Accordingly, the tolerance center can be set near 1.65 mg when the tolerance in the electrolyte injection step is ±0.05 mg, thus achieving more stable productivity and longevity traits. According to this embodiment, therefore, stable production conditions in terms of both yield and longevity can be determined.

TABLE 1

| | Amount injected [mg] | 1.3 | 1.4 | 1.5 | 1.6 | 1.7 | 1.8 |
|---|---|---|---|---|---|---|---|
| Embodiment | Initial internal resistance Ri [Ω] | 110 | 95 | 93 | 93 | 93 | 93 |
| | Internal resistance Ri [Ω] after 500 hours of charging | 600 | 550 | 380 | 370 | 370 | 370 |
| | Yield [%] | 100 | 100 | 100 | 100 | 100 | 99.2 |
| Comparative example | Initial internal resistance Ri [Ω] | 140 | 93 | 93 | 93 | 93 | — |
| | Internal resistance Ri [Ω] after 500 hours of charging | 800 | 700 | 650 | 580 | 500 | — |
| | Yield [%] | 100 | 100 | 100 | 99.8 | 30 | 0 |

In the comparative example, the manufacturing yield dropped when the amount of electrolyte was 1.6 mg or more. This is because when the total amount of electrolyte exceeds the amount that can be held in the separator 130c, the electrolyte overflows when the lid 12 is closed or enters the joint surface with the lid 12 to cause sealing failure. Accordingly, the drop in yield becomes more prominent as the amount of electrolyte increases.

Figure 7:
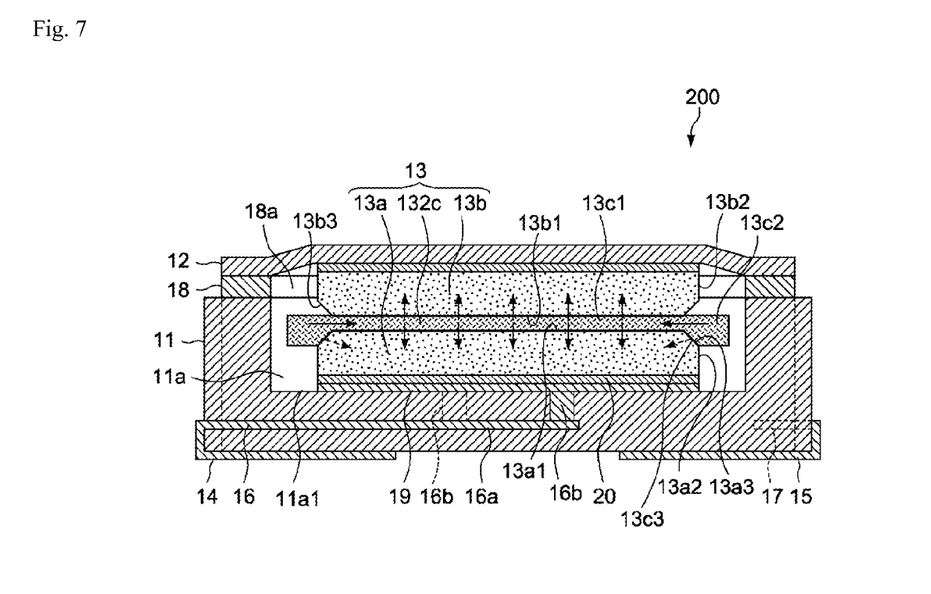
FIG. 7 External perspective view of the electrochemical device pertaining to the second embodiment of the present invention.

Also in the comparative example, the internal resistance Ri after charging exhibited a tendency to rise more when there was less electrolyte. This is probably because continuous charging led to a decrease in the electrolyte retained in the Second Embodiment FIG. 7 shows the electrochemical device pertaining to the second embodiment of the present invention. An electrochemical device 200 according to this embodiment is different from the aforementioned first embodiment in terms of the constitution of a separator sheet 132c. The following primarily explains this constitution different from the first embodiment, and other constitutions identical to those in the aforementioned embodiment are denoted by the same symbols and their explanations are skipped or simplified.

The separator sheet 132c in this embodiment has the high liquid absorptivity part (first part) 13c1 placed between the two electrode sheets 13a, 13b, low liquid absorptivity part (second part) 13c2 extending outward from the two electrode sheets 13a, 13b, and contact part (third part) 13c3 provided in the surface region of the low liquid absorptivity part 13c2 near the first electrode sheet 13a. The contact part 13c3 is constituted in such a way that it contacts at least one part of the rim surface 13a3 of the first electrode sheet 13a.

In this embodiment, the contact part (third part) 13c3 provided in one part of the surface of the low liquid absorptivity part 13c2 is in contact with the rim surface 13a3 of the first electrode sheet 13a, and therefore electrolyte is drawn in directly not only from the high liquid absorptivity part 13c1 to the first electrode sheet 13a, but also from the low liquid absorptivity part 13c2 to the first electrode sheet 13a via the contact part 13c3 (refer to the broken-line arrows in FIG. 7) as the electrolyte in the first electrode sheet 13a breaks down, deteriorates, or undergoes other change. In other words, the phenomenon of the amount of electrolyte decreasing in the high liquid absorptivity part 13c1, which occurs as the electrolyte impregnated into the high liquid absorptivity part 13c1 is drawn into the first electrode sheet 13a, can be suppressed by the electrolyte-replenishing action from the low liquid absorptivity part 13c2 and contact part 13c3 to the first electrode sheet 13a.

Any method can be adopted as deemed appropriate in order to stably form the contact part 13c3 of the separator sheet 132c as shown in FIG. 7, such as not forming the rim surface 13b3 of the second electrode sheet 13b, or making the size (Wb and Lb) of the second electrode sheet 13b greater than the size (Wa and La) of the first electrode sheet 13a, or forming the taper angle of the rim surface 13a3 of the first electrode sheet 13a to be more gradual than the taper angle of the rim surface 13b3 of the second electrode sheet 13b.

Third Embodiment

Figure 8:
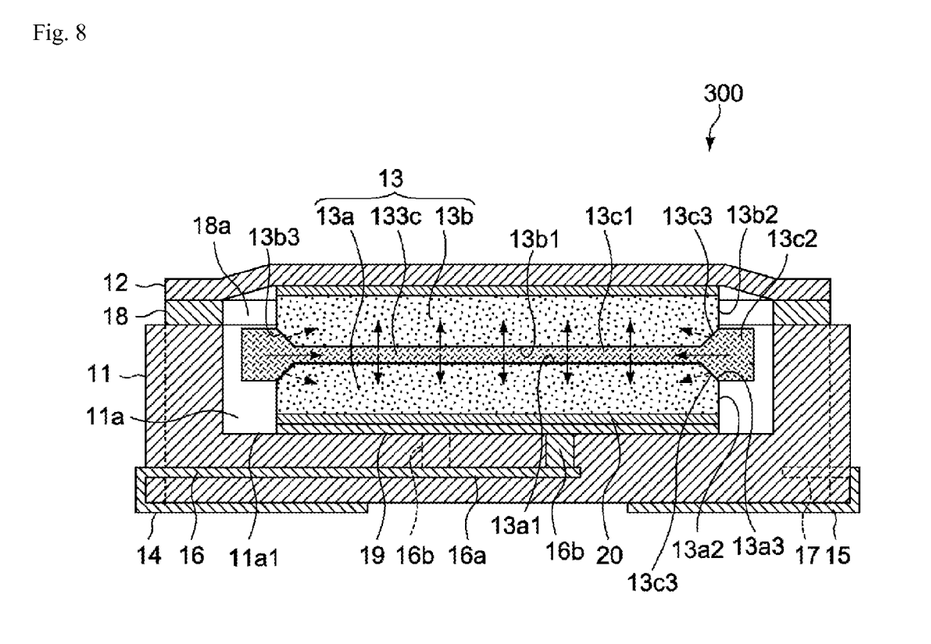
FIG. 8 External perspective view of the electrochemical device pertaining to the third embodiment of the present invention.

FIG. 8 shows the electrochemical device pertaining to the third embodiment of the present invention. An electrochemical device 300 according to this embodiment is different from the aforementioned first embodiment in terms of the constitution of a separator sheet 133c. The following primarily explains structures different from the first embodiment, and other structures identical to those in the aforementioned embodiment are denoted by the same symbols and their explanations are skipped or simplified.

The separator sheet 133c in this embodiment has the high liquid absorptivity part (first part) 13c1 placed between the two electrode sheets 13a, 13b, low liquid absorptivity part (second part) 13c2 extending outward from the two electrode sheets 13a, 13b, and contact parts (third parts) 13c3 provided in the surface region of the low liquid absorptivity part 13c2 near the first electrode sheet 13a and that near the second electrode sheet 13b. Each contact part 13c3 is constituted in such a way that it contacts at least one part of the rim part 13a3, 13b3 of the first or second electrode sheet 13a, 13b.

In this embodiment, the contact part (third part) 13c3 provided in one part of each surface of the low liquid absorptivity part 13c2 is in contact with the rim surface 13a3, 13b3 of the first or second electrode sheet 13a, 13b and therefore electrolyte is drawn in directly not only from the high liquid absorptivity part 13c1 to the first and second electrode sheets 13a, 13b, but also from the low liquid absorptivity part 13c2 to the first and second electrode sheets 13a, 13b via the respective contact parts 13c3 (refer to the broken-line arrows in FIG. 8) as the electrolyte in the first and second electrode sheets 13a, 13b breaks down, deteriorates, or undergoes other change. In other words, the phenomenon of the amount of electrolyte decreasing in the high liquid absorptivity part 13c1, which occurs as the electrolyte impregnated into the high liquid absorptivity part 13c1 is drawn into the first and second electrode sheets 13a, 13b, can be suppressed by the electrolyte-replenishing action from the low liquid absorptivity part 13c2 and contact parts 13c3 to the first and second electrode sheets 13a, 13b.

Fourth Embodiment

Figure 9:
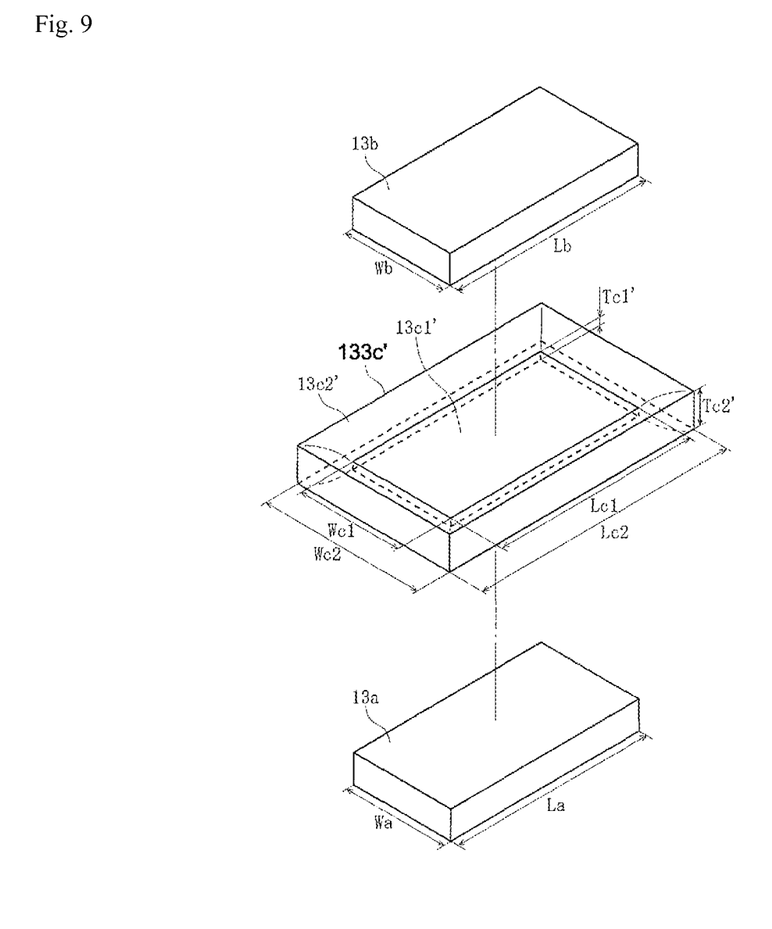
FIG. 9 Perspective view showing the constitution, prior to placement, of the storage device of the electrochemical device pertaining to the fourth embodiment of the present invention.
Figure 10:
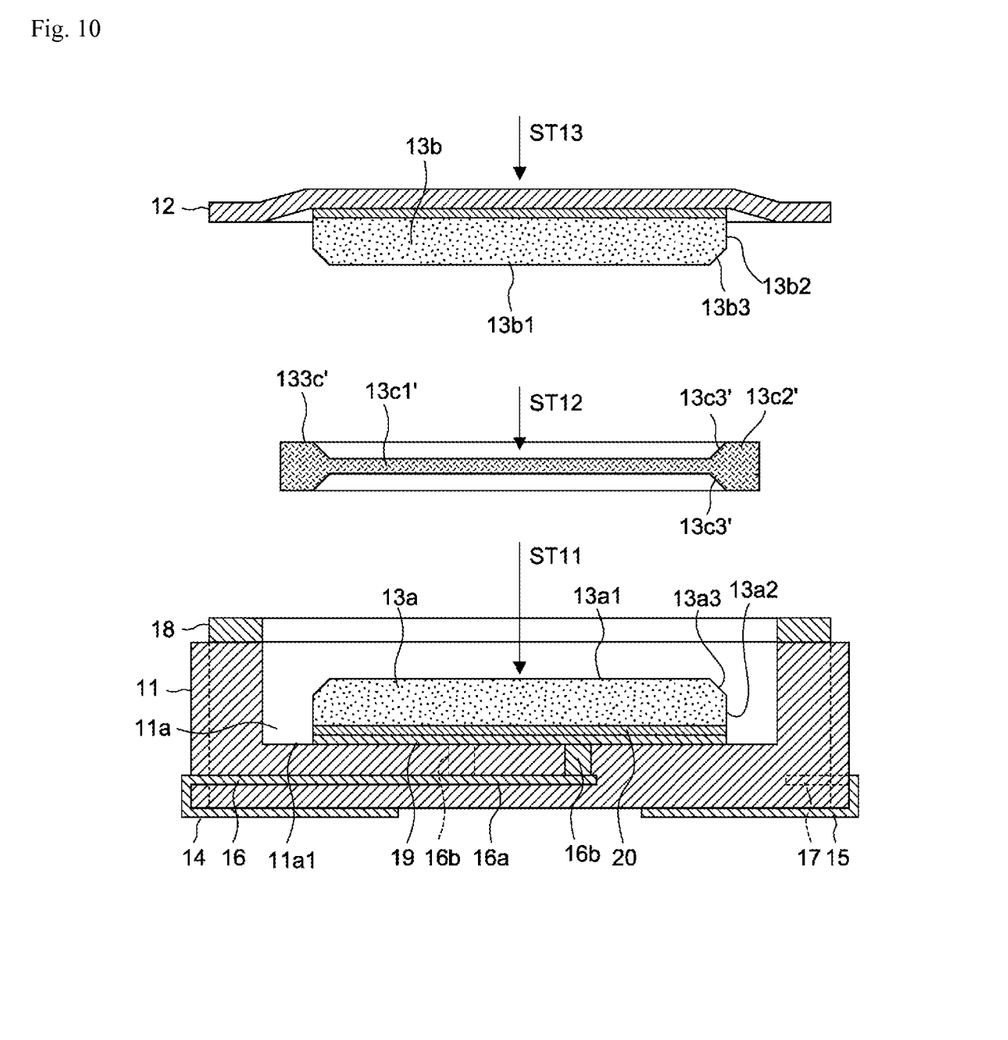
FIG. 10 Drawing for explaining how the first electrode sheet, second electrode sheet, and separator sheet as shown in FIG. 9 are placed (how the electric storage element is placed).

FIGS. 9 and 10 show the fourth embodiment of the present invention, where FIG. 9 is an exploded perspective view of the electric storage element and FIG. 10 is an exploded perspective view of the electrochemical device.

The electrochemical device according to this embodiment is constituted in the same manner as with the electrochemical device 300 explained in the third embodiment, except that a separator sheet 133c' of the electric storage element 13 is comprised of a molded product having a high liquid absorptivity part (first part) 13c1', low liquid absorptivity part (second part) 13c2' and contact part (third part) 13c3'. Other structures are identical to those in the first and third embodiments and their explanations are thus skipped.

The separator sheet 133c' shown in FIG. 9 is comprised of a base material of separator sheet RM13c that has been press-formed to shape the high liquid absorptivity part 13c1' and low liquid absorptivity part 13c2' beforehand. To be specific, the center part of the base material of separator sheet RM13c is pressed and crushed using a top die having the same shape as the top surface 13a1 of the first electrode sheet 13a and bottom die having the same shape as the bottom surface 13b1 of the second electrode sheet 13b, to form the high liquid absorptivity part 13c1' with a thickness of Tc1'. Since the outer periphery part of the base material of separator sheet RM13c is not crushed, the uncrushed part becomes the low liquid absorptivity part 13c2' with a thickness (maximum thickness) of Tc2'. The thickness Tc1' of the high liquid absorptivity part 13c1' and thickness Tc2' of the low liquid absorptivity part 13c2' are not limited in any way and can be set to any thickness as deemed appropriate.

As explained earlier, the base material of separator sheet RM13c has a hardness (flexibility) that allows it to be crushed, but if the base material of separator sheet RM13c has strong elasticity, then the thickness Tc1' of the high liquid absorptivity part 13c1' that has been formed by crushing may increase after crushing. In this case, ideally the heat needed to plasticize the high liquid absorptivity part 13c1' should be applied at the same time when it is press-formed, followed by cooling after crushing, in order to maintain the thickness Tc1' of the high liquid absorptivity part 13c1'.

To place the electric storage element 13, as shown in FIG. 10, first uncured conductive adhesive is applied to the surface of the current collector film 19 and the bottom surface of the first electrode sheet 13a is pressed against the conductive adhesive so that it adheres, after which the conductive adhesive is cured and then electrolyte is injected and thus impregnated into the first electrode sheet 13a (refer to Step ST11). Next, the bottom surface of the high liquid absorptivity part 13c1' of the separator sheet 133c' is placed on the top surface 13a1 of the first electrode sheet 13a in an aligning manner and then electrolyte is injected and thus impregnated into the separator sheet 133c' (refer to Step ST12). Around the same time, the same uncured conductive adhesive is applied to the bottom surface of the lid 12 and the top surface of the second electrode sheet 13b is pressed against the conductive adhesive so that it adheres, after which the conductive adhesive is cured and then electrolyte is injected and thus impregnated into the second electrode sheet 13*b*. Next, the outer periphery part of the bottom surface of the lid 12 is overlaid onto the top surface of the coupling ring 18, while at the same time the bottom surface 13*b*1 of the second electrode sheet 13*b* is placed on the top surface of the high liquid absorptivity part 13*c*1' of the separator sheet 133*c'* in an aligning manner (refer to Step ST13). Next, the lid 12 is coupled to the coupling ring 18.

If the applicable polarities of the first electrode sheet 13*a* and second electrode sheet 13*b* constituting the electric storage element 13 are predetermined, then attention should be paid to the order of insertion with respect to each concaved section 11*a* of the case 11 (including the inner hole 18*a* of the coupling ring 18) when the electric storage element 13 is placed in it. For example, if the applicable polarity of the first electrode sheet 13*a* is set to positive and that of the second electrode sheet 13*b* is set to negative, then the first electrode sheet 13*a* on the positive electrode side should face the top surface of the current collector film 19, while the second electrode sheet 13*b* on the negative electrode side should face the bottom surface of the lid 12.

The section shape of the separator sheet 133*c'* after the placement of the electric storage element 13 is the same as the section shape of the separator sheet 133*c* shown in FIG. 8, and the void ratio and liquid absorptivity of the separator sheet 133*c'* are also the same as the void ratio and liquid absorptivity of the separator sheet 133*c* shown in FIG. 8.

Effects of Electrochemical Device

Fourth Embodiment

According to the aforementioned electrochemical device, the same effects as expected from the first and third embodiments described above can be achieved. In addition, because a recess is present on the bottom surface side of the high liquid absorptivity part 13*c*1' of the separator sheet 133*c'* and this bottom surface shape is aligned with the top surface shape of the first electrode sheet 13*a*, and also because a recess is present on the top surface side of the high liquid absorptivity part 13*c*1' and this top surface shape is aligned with the bottom surface shape of the second electrode sheet 13*b*, the bottom surface of the high liquid absorptivity part 13*c*1' of the separator sheet 133*c'* can be positioned with the top surface of the first electrode sheet 13*a* easily and accurately when the former is placed on the latter, while at the same time the bottom surface of the second electrode sheet 13*b* can be positioned easily and accurately with the top surface of the high liquid absorptivity part 13*c*1' of the separator sheet 133*c'* when the former is placed on the latter.

The foregoing explained embodiments of the present invention; however, the present invention is not limited to the aforementioned embodiments and it goes without saying that various changes may be added so long as doing so does not cause the present invention to deviate from its key points.

For example, while the rim surface 13*a*3, 13*b*3 of the electrode sheet contacted by the contact part 13*c*3 of the separator sheet is formed between the principal surface 13*a*1, 13*b*1 and outer side surface 13*a*2, 13*b*2 in the examples explained under the foregoing embodiments, this rim surface may be any surface so long as the surface is formed around the principal surface 13*a*1, 13*b*1, and the outer side surface 13*a*2, 13*b*2 may be applied as this rim surface, for example.

In addition, the contact part 13*c*3 of the separator sheet need not be constituted in a manner continuously contacting the entire region of the rim surface of the electrode sheet, but it may contact only at least one part of the rim surface instead. Alternatively, the contact part 13*c*3 need not be formed continuously along the periphery of the low liquid absorptivity part 13*c*2, but it may be formed non-continuously (intermittently), for example, because such constitution still allows the same operations and effects as described above to be achieved.

DESCRIPTION OF THE SYMBOLS

100, 200, 300—Electrochemical device
11—Case
11*a*—Concaved section
12—Lid
13—Electric storage element
13*a*—First electrode sheet
13*b*—Second electrode sheet
131*c*, 132*c*, 133*c*, 133*c'*—Separator sheet
13*c*1, 13*c*1'—High liquid absorptivity part
13*c*2, 13*c*2'—Low liquid absorptivity part
13*c*3, 13*c*3'—Contact part

What is claimed is:

1. An electrochemical device comprising:
a case with a concaved section constituting an opening;
a lid coupled to an opening side of the case to form a closed section between itself and the concaved section; and
an electric storage element that includes
a first electrode sheet having a first principal surface and a first rim surface formed around the first principal surface, said first rim surface being constituted by a planar or curved tapered surface formed by removing a periphery edge of the first principal surface,
a second electrode sheet having a second principal surface facing the first principal surface and a second rim surface formed around the second principal surface, said second rim surface being constituted by a planar or curved tapered surface formed by removing a periphery edge of the second principal surface, and
a porous separator sheet installed between the first principal surface and second principal surface and capable of retaining an electrolyte,
said electric storage element being sealed inside the closed section and constituted in a chargeable/dischargeable manner;
wherein the separator sheet has:
a first part placed between the first electrode sheet and second electrode sheet and crushed by the first principal surface and second principal surface;
a second part extending outward from the first electrode sheet and second electrode sheet; and
a third part provided at least in one part of the second part and placed in contact entirely with at least one of the first rim surface and second rim surface by being pressed against at least one of the first rim surface and second rim surface, said third part being capable of supplementing the electrolyte;
wherein at least one of the first rim surface and second rim surface is provided between an outer side surface of the first electrode sheet and the first principal surface or between an outer side surface of the second electrode sheet and the second principal surface.

2. An electrochemical device according to claim 1, wherein the first rim surface is provided between an outer side surface and the first principal surface of the first electrode sheet, and the third part is in contact with the first rim surface, said outer side surface being perpendicular to and surrounding the first principal surface.

3. An electrochemical device according to claim 1, wherein the second rim surface is provided between an outer side surface and the second principal surface of the second electrode sheet, and the third part is in contact with the second rim surface.

4. An electrochemical device according to claim 2, wherein the second rim surface is provided between an outer side surface and the second principal surface of the second electrode sheet, and the third part is in contact with the second rim surface.

* * * * *